United States Patent [19]

Welschof

[11] 4,094,376
[45] June 13, 1978

[54] BEARING ASSEMBLY FOR A WHEEL HUB

[75] Inventor: Hans-Heinrich Welschof, Rodenbach, Germany

[73] Assignee: Lohr & Bromkamp GmbH, Offenbach am Main, Germany

[21] Appl. No.: 736,888

[22] Filed: Oct. 29, 1976

[30] Foreign Application Priority Data

Oct. 31, 1975 Germany .............................. 2548722

[51] Int. Cl.² ............................................. F16C 33/76
[52] U.S. Cl. .................................... 180/43 R; 64/21; 64/32 F; 301/105 R; 308/187.1; 308/191
[58] Field of Search ................. 64/21, 22, 17 A, 32 F, 64/7; 180/43 R; 308/191, 3 R, 16–17, 187.1, 187.2, 210, 190, 192; 301/105 R; 277/65, 82

[56] References Cited

U.S. PATENT DOCUMENTS

| 1,397,413 | 11/1921 | Evans | 64/32 F |
| 2,107,073 | 2/1938 | Herrington | 180/43 R |
| 2,623,604 | 12/1952 | Keese | 180/43 R |
| 2,685,184 | 8/1954 | Nador et al. | 180/43 R X |
| 3,042,133 | 7/1962 | Ordorica | 180/43 R |
| 3,792,597 | 2/1974 | Orain | 64/7 |
| 3,817,057 | 6/1974 | Orain | 64/21 X |
| 3,842,621 | 10/1974 | Mazziotti | 64/21 X |

FOREIGN PATENT DOCUMENTS 712,032 6/1965 Canada .............................. 180/43 R Primary Examiner—Trygve M. Blix
Assistant Examiner—Douglas C. Butler
Attorney, Agent, or Firm—Edmund M. Jaskiewicz

[57] ABSTRACT

A vehicle wheel hub which is driven through a constant velocity universal joint has a bearing assembly mounted on the wheel support of the vehicle. The bearing assembly has an inner race mounted on the wheel hub and an outer race mounted on the wheel support. One end of the wheel hub is non-rotatably and detachably connected to the inner joint member of the universal joint and the other end of the wheel hub has a flange to which a wheel can be attached. A flexible boot encloses the universal joint and extends over the bending range of the outer and inner joint members. The boot can be mounted so as to be rotatable or stationary.

6 Claims, 4 Drawing Figures

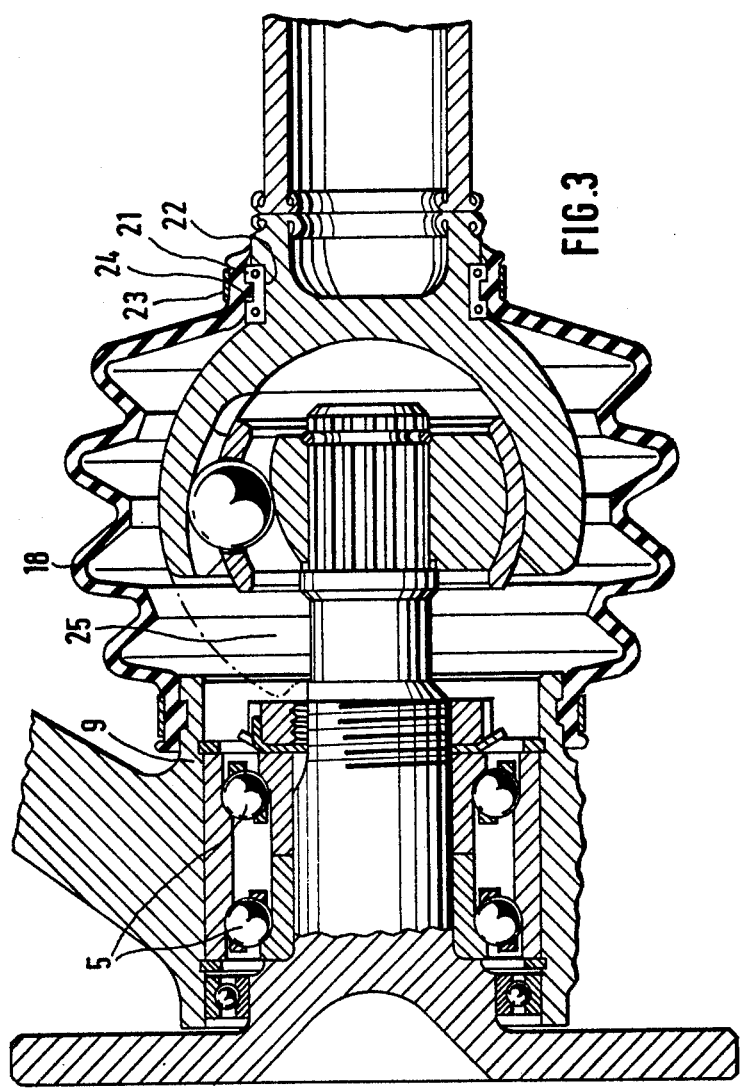

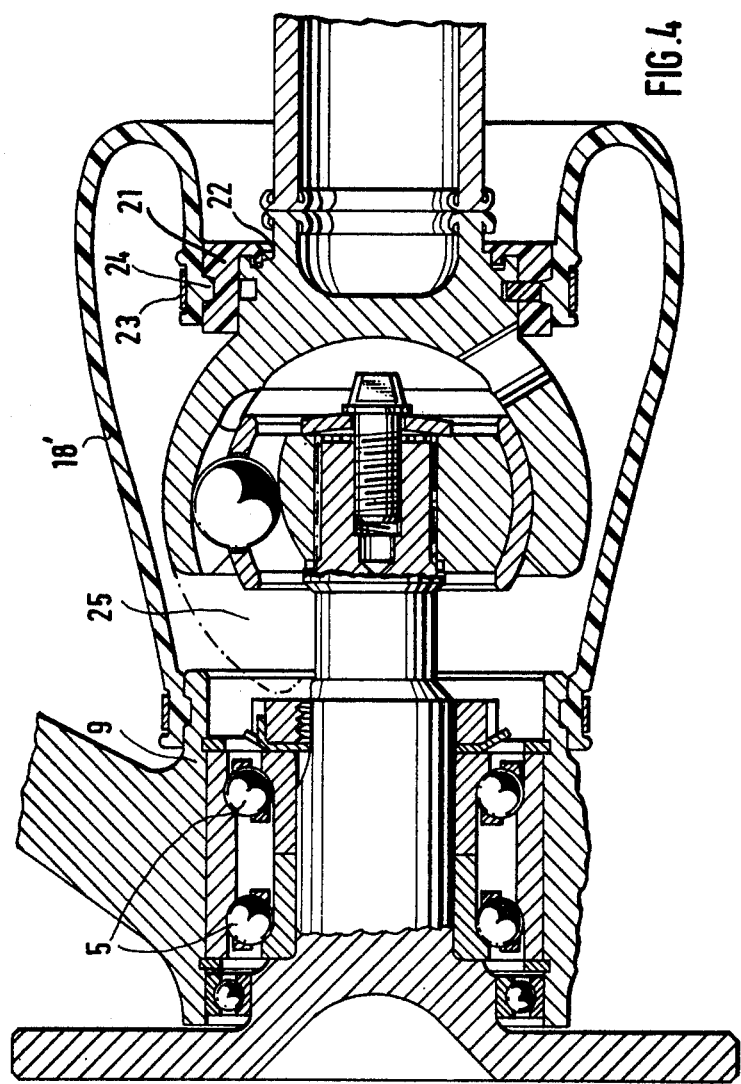

BEARING ASSEMBLY FOR A WHEEL HUB

The present invention relates to a bearing assembly for a wheel hub which is driven by a constant velocity universal joint, more particularly, to the construction of the wheel hub and the mounting of a protective boot to enclose the universal joint.

Various forms of vehicles have been provided with a wheel hub which is driven by a constant velocity universal joint. The wheel hub is journaled in a bearing assembly mounted on the wheel support of the vehicle and the bearing assembly comprises an outer race ring attached to the wheel support and an inner bearing race mounted upon the wheel hub. Such a mounting of a wheel hub is commonly utilized on the front wheels of front wheel drive vehicles.

A common form of such a wheel hub assembly comprises the drive shaft to be connected to the inner joint member of the constant velocity joint and the outer joint member of the universal joint is connected to the wheel hub. Such a conventional assembly has the disadvantage in that all of the components must be precisely concentrically aligned and positioned with respect to each other before they are permanently installed in order to produce correct and proper operation. In addition, very small manufacturing tolerances must be carefully observed with respect to such assemblies. Those wheel hub assemblies wherein the inner bearing race is welded to the inner annular portion of the outer joint member has the disadvantage that sparks and portions of welding material produced during the assembly operation may damage the grooves in which the bearings are positioned even though a rubber ring is generally provided. Such a rubber ring is susceptible to slipping during the assembly operation and adds an additional cost in the fabrication of the bearing assembly. A further disadvantage is that because of inaccurate concentric positioning, the grooves or tracks of the ball bearings may be displaced with respect to each other during the welding operation and as a result it is virtually impossible to achieve the precise mounting and assembly necessary for proper performance.

In another form of a wheel hub assembly the inner rings of the bearing and the outer portion of the joint member are provided with corresponding V-groove configurations. Such an assembly has the disadvantage that if the joint and bearing are radially positioned with respect to each other in order to position the universal joint close to the wheel hub, the bearing must have a very large interior diameter in order to accommodate the outer joint member of the universal joint. If, as an alternative, the universal joint is positioned axially with respect to the bearing so as to enable a smaller bearing to be used an intermediate component is necessary to connect the universal joint to the hub and this adds to the overall costs of the assembly.

It is therefore the principal object of the present invention to provide a novel and improved bearing assembly for a wheel hub which is driven through a constant velocity universal joint.

It is another object of the present invention to provide a bearing and wheel hub assembly having a simplified bearing construction and wherein the wheel bearing has a relatively small diameter so as to reduce significantly the costs of the assembly.

It is a further object of the present invention to provide such a bearing and wheel hub assembly which optimally utilizes the bending angle of the universal joint by reducing to a minimum the distance between the flange upon which the wheel is mounted and the center of the universal joint.

According to one aspect of the present invention a bearing assembly for such a wheel hub may comprise a constant velocity universal joint mounted on a wheel support of a vehicle and having outer and inner joint members. A wheel hub is journaled by bearing means comprising an outer bearing race on the wheel support and an inner bearing race mounted on the wheel hub. The wheel hub has one end non-rotatably and detachably connected to the inner joint member and the other end of the hub has a flange to which a wheel can be attached. A flexible boot encloses the universal joint and extends over the bending angle of the outer and inner joint members.

An advantage of the present invention is that the wheel flange is connected directly with the inner joint member of the universal joint preferably by a toothed or splined connection. This is in contrast with the conventional wheel bearings for front wheel drives wherein the torque is transmitted from the drive shaft through the inner joint member to the outer joint member of the universal joint and then through a spindle to the wheel hub. As a result of the present invention, a torque transmitting meshing connection is not required. Further, the bearings are mounted on the shank portion of the wheel hub so that the bearings may be of a relatively small dimension as compared with previously known structures.

The flexible protective boot is mounted so as to be fixed or rotatable with respect to the universal joint. As a result, the center of the universal joint is positioned relatively close to the wheel flange without creating any problems for sealing of the joint. The flexible boot permits the full bending angle of the universal joint to be completely utilized.

Other objects and advantages of the present invention will be apparent upon reference to the accompanying description when taken in conjunction with the following drawings, which are exemplary, wherein;

FIG. 3 is a view similar to that of FIG. 1 but showing the flexible boot being mounted so as to be non-rotatable; and FIG. 4 is a view similar to that of FIG. 1 but showing a further modification of a non-rotatable mounting of the flexible protective boot.

Proceeding next to the drawings wherein the reference symbols indicate the same parts throughout the various views a specific embodiment and modifications of the present invention will be described in detail.

Figure 1:
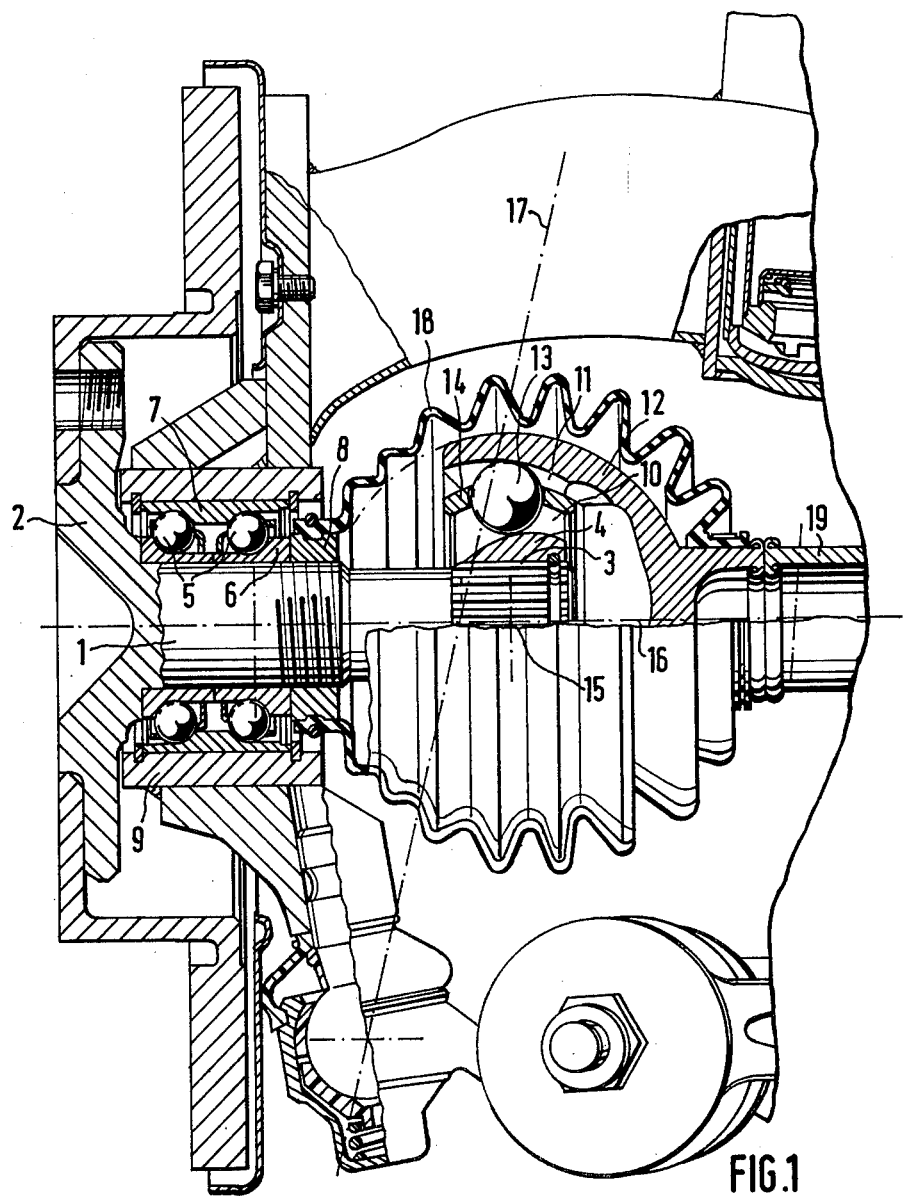
FIG. 1 is a longitudinal sectional view of a wheel bearing assembly and showing the supporting wheel bearings and universal joint in accordance with the present invention.

In FIG. 1, there is shown a wheel bearing assembly for a motor vehicle according to the present invention having the universal joint and comprising a wheel hub 1 on one end of which is provided a flange 2 upon which a wheel is mounted by bolts in a manner as known in the art. The other end of the wheel hub 1 is provided with longitudinal splines 3 for non-rotatable connection to an inner joint member 4 of the universal joint. A locking ring is provided to prevent axial sliding displacement between the inner joint member 4 and the splined end 3 of the wheel hub.

The wheel hub 1 is provided with a shank portion and ball bearings 5 are mounted directly on the shank portion by means of inner bearing races 6 which are secured against axial sliding displacement by means of a locking nut 8. Outer bearing races 7 are similarly fixed by suitable locking rings or the like in an outer bearing ring 9 which is mounted in the wheel support. Both of the bearing races 6 and 7 are provided with annular track grooves within which the bearings 5 are positioned. The diameters of the bearing assemblies may be maintained relatively small so as to avoid the large dimensions of bearings previously known in the art.

The inner joint member 4 of the universal joint has a plurality of substantially axially extending grooves 10 formed in its outer surface. The grooves 10 are opposed from and correspond to a similar plurality of grooves 11 provided in the inner surface of the outer joint member 12 of the universal joint. Torque transmitting balls 13 are positioned in the opposed pairs of grooves 10 and 11 and are received in openings of a retaining cage 14 so that the balls are maintained in a plane which bisects the bending angle of the universal joint.

The center of the universal joint is indicated at 15. In order to obtain an optimum range and performance of the universal joint the joint center is located very close to and preferably at the point of intersection between the axis of rotation 16 of the joint and the axis 17 about which the wheel turns when being steered. Under these conditions the full lock steering angle of the hub assembly will correspond to the maximum bending angle of the universal joint.

The outer joint member 12 of the universal joint is secured to a drive shaft 19 such as by friction welding.

A flexible protective and sealing boot 18 of a resilient plastic material is fitted over the entire constant velocity universal joint in order to retain lubricant therein and to exclude dirt and other foreign substances therefrom. The boot 18 is of the bellows type and has one end attached to the outer joint member 12 adjacent the drive shaft 19 by means of a clamping ring or the like and the other end secured by a clamping ring to the locking nut 8. Since the locking nut 8 is threaded upon the shank of the wheel hub as may be seen in FIG. 1 it is apparent that the boot 18 will rotate with the universal joint.

As a modification, the end of the boot which is secured to the nut 8 as shown in FIG. 1 may be attached to the outer bearing support member 9 by a slide or rotatable bearing so that the boot 18 will rotate with the universal joint.

Figure 2:
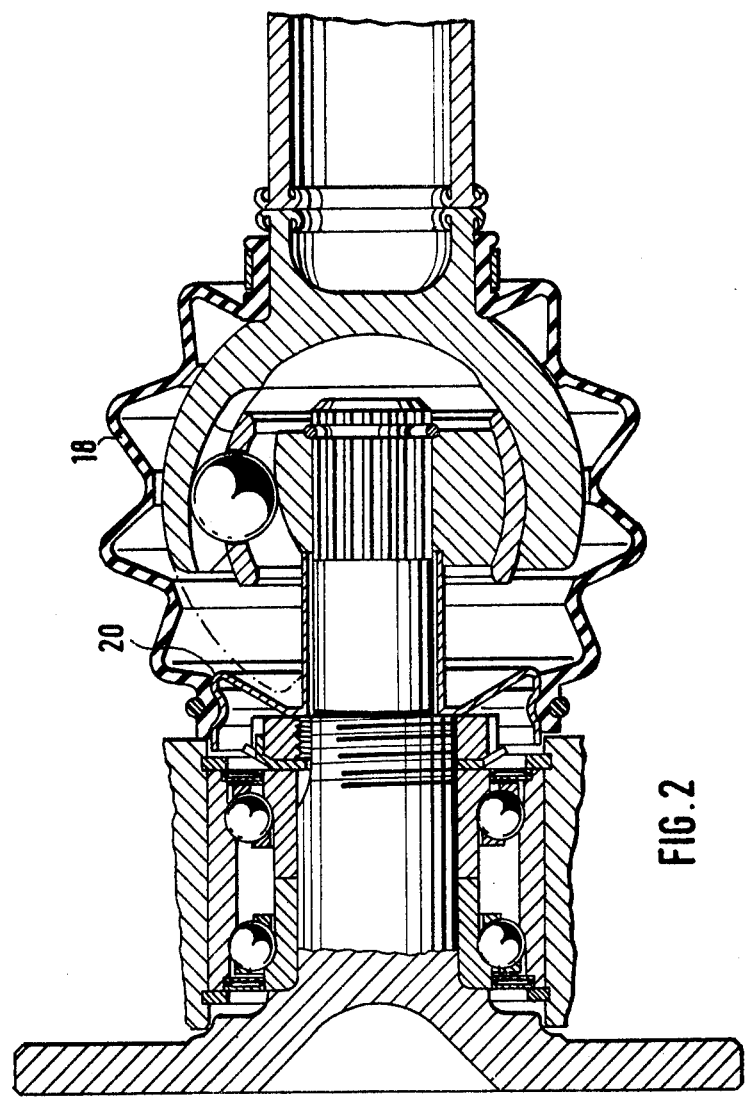
FIG. 2 is a view similar to that of FIG. 1 and illustrating a modified structure for mounting of the flexible boot.

In FIG. 2, the wheel bearing assembly is similar to that of FIG. 1 except that the end of the boot 18 adjacent to the bearings is mounted on the peripheral portion of a sleeve 20 which is positioned upon the shank of the wheel hub 1. As a result, the boot 18 is located radially outwardly of the joint which produces a favorable load and stress relationship. This relationship results from the universal joint being positioned in the central portion of the boot.

In FIG. 3, the boot 18 has its inner end attached to the outer bearing support member 9 by a clamping ring or the like such that the boot 18 is non-rotatable with respect to the universal joint. The other end of the boot is secured to a bearing member 21 comprising two bearing shells running in a groove 22 formed in or mounted upon the outer joint member 12. A strap or band 23 secures this end of the boot in position upon the bearing member and a sealing lip 24 is provided to seal the bearing 21. The interior of the universal joint indicated at 25 and the wheel bearings 5 are thus effectively sealed by a single boot 18 and the universal joint will thus rotate with respect to the boot 18 which in this construction is maintained in a non-rotating position.

In FIG. 4, a protective boot 18' is of a flexible material but does not have the bellows construction of the previously illustrated boots and the ends of the boot 18' are secured in the same manner as the ends of the boot 18 shown in FIG. 3.

In the assemblies of FIGS. 3 and 4 wherein the boot does not rotate with the hub and universal joint but merely flexes as a result of steering and suspension movements, the boot may be made from a relatively lower grade material than that required for the boot when the boot is rotatable. A non-rotating boot may be constructed of a suitable material such as polyethylene.

The mounting of the protective boot described and illustrated above both protects and lubricates the wheel bearings and as a result eliminates a separate seal between the bearing and the universal joint. This result is achieved both by the rotating and non-rotating boots as described above.

Thus it can be seen that the present invention has disclosed a wheel bearing assembly which enables the center of the universal joint to be positioned very close to and possibly in coincidence with the steering axis of the wheel so as to provide for optimum functioning of the hub assembly.

It will be understood that this invention is susceptible to modification in order to adapt it to different usages and conditions, and accordingly, it is desired to comprehend such modifications within this invention as may fall within the scope of appended claims.

What is claimed is:

1. In a bearing assembly for a wheel hub, the combination of a constant velocity universal joint mounted on a wheel support of a vehicle and having rotatable outer and inner joint members, a wheel hub, bearing means journaling said wheel hub within the wheel support and comprising an inner bearing race mounted on said wheel hub and an outer bearing race on the wheel support, said wheel hub having one end non-rotatably but detachably connected to said inner joint member and the other end of said hub having a flange to which a wheel can be attached, and a flexible boot having one end mounted upon said rotatable outer joint member and another end mounted upon one of said wheel support and said wheel hub at said wheel support to enclose said universal joint and extend over the bending range of the outer joint member and the inner joint member such that a seal is defined between rotatable and non-rotatable elements.

2. In a bearing assembly as claimed in claim 1 wherein said boot has one end attached to the wheel support and the other end attached to said outer joint member.

3. In a bearing assembly as claimed in claim 2 and a slide bearing attaching said boot other end to said outer joint member such that said boot is non-rotatable.

4. In a bearing assembly as claimed in claim 1 wherein there is a drive shaft connected to said outer joint member, one end of said boot slidingly supported on said wheel support and its other end attached to said outer joint member in the vicinity of said drive shaft.

5. In a bearing assembly as claimed in claim 1 wherein there is a drive shaft connected to said outer joint member, means on said hub for securing the inner bearing race therein, one end of said boot attached to said securing means and the other end of the boot attached to said outer joint member in the vicinity of said drive shaft.

6. In a bearing assembly as claimed in claim 1 and a sleeve on said hub adjacent said bearing means and having a peripheral portion spaced from said hub, one end of said boot attached to said sleeve peripheral portion and the other end attached to said outer joint member.

* * * * *